US010781755B2

(12) United States Patent
McCune

(10) Patent No.: US 10,781,755 B2
(45) Date of Patent: Sep. 22, 2020

(54) TURBINE ENGINE GEARBOX

(71) Applicant: United Technologies Corporation, Farmington, CT (US)

(72) Inventor: Michael E. McCune, Colchester, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 233 days.

(21) Appl. No.: 15/943,812

(22) Filed: Apr. 3, 2018

(65) Prior Publication Data
US 2018/0245518 A1 Aug. 30, 2018

Related U.S. Application Data

(63) Continuation of application No. 14/940,632, filed on Nov. 13, 2015, now abandoned, which is a
(Continued)

(51) Int. Cl.
*F02C 7/36* (2006.01)
*F16H 1/28* (2006.01)
(Continued)

(52) U.S. Cl.
CPC ............. *F02C 7/36* (2013.01); *F01D 15/12* (2013.01); *F02K 3/04* (2013.01); *F02K 3/072* (2013.01);
(Continued)

(58) Field of Classification Search
CPC .. F02C 7/36; F02C 3/113; F02C 3/107; F05D 2260/4031; F05D 2260/40311
See application file for complete search history.

(56) References Cited

U.S. PATENT DOCUMENTS 2,067,477 A 1/1937 Cooper
2,258,792 A 4/1941 New
(Continued)

FOREIGN PATENT DOCUMENTS

EP 0791383 8/1997
EP 1142850 10/2001
(Continued)

OTHER PUBLICATIONS

Whitaker, R. (1982). ALF 502: plugging the turbofan gap. Flight International, p. 237-241, Jan. 30, 1982.
(Continued)

*Primary Examiner* — Mark A Laurenzi
*Assistant Examiner* — Loren C Edwards
(74) *Attorney, Agent, or Firm* — Carlson, Gaskey & Olds, P.C.

(57) ABSTRACT

A gas turbine engine according to an example of the present disclosure includes, among other things, a fan, a compressor, a combustor, and a spool including a fan drive turbine that drives the fan through a gear reduction. The gear reduction includes at least two double helical gears in meshed engagement, each of the at least two double helical gears having a first plurality of gear teeth separated from a second plurality of gear teeth such that a first end of the first plurality of gear teeth and a first end of the second plurality of gear teeth are spaced apart by an axial distance. Each of the first plurality of gear teeth is offset a first circumferential offset distance in relation to the next gear tooth of the second plurality of gear teeth when moving in a circumferential direction relative to respective axes.

30 Claims, 5 Drawing Sheets

Related U.S. Application Data continuation of application No. 14/470,982, filed on Aug. 28, 2014, now Pat. No. 9,222,416, which is a continuation of application No. 14/174,878, filed on Feb. 7, 2014, now Pat. No. 9,169,781, which is a continuation-in-part of application No. 13/438,245, filed on Apr. 3, 2012, now Pat. No. 8,720,306.

(60) Provisional application No. 61/592,964, filed on Jan. 31, 2012.

(51) Int. Cl.
  *F01D 15/12* (2006.01)
  *F02K 3/072* (2006.01)
  *F16H 57/00* (2012.01)
  *F16H 1/46* (2006.01)
  *F02K 3/04* (2006.01)

(52) U.S. Cl.
  CPC .............. *F16H 1/28* (2013.01); *F16H 1/46* (2013.01); *F16H 57/0006* (2013.01); *F05D 2260/40311* (2013.01); *Y02T 50/671* (2013.01)

(56) References Cited

U.S. PATENT DOCUMENTS

| | | |
|---|---|---|
| 2,684,591 A | 7/1954 | Lundquist |
| 2,734,396 A | 2/1956 | Falk et al. |
| 2,823,558 A | 2/1958 | Semar |
| 2,936,655 A | 5/1960 | Peterson et al. |
| 3,021,731 A | 2/1962 | Stoeckicht |
| 3,160,026 A | 12/1964 | Rosen |
| 3,194,487 A | 7/1965 | Tyler et al. |
| 3,287,906 A | 11/1966 | McCormick |
| 3,352,178 A | 11/1967 | Lindgren et al. |
| 3,412,560 A | 11/1968 | Gaubatz |
| 3,682,015 A | 8/1972 | Richardson |
| 3,747,343 A | 7/1973 | Rosen |
| 3,754,484 A | 8/1973 | Roberts |
| 3,820,719 A | 6/1974 | Clark |
| 3,892,358 A | 7/1975 | Gisslen |
| 3,932,058 A | 1/1976 | Harner et al. |
| 3,935,558 A | 1/1976 | Miller et al. |
| 3,969,956 A | 7/1976 | Hanslik |
| 3,988,889 A | 11/1976 | Chamay et al. |
| 4,130,872 A | 12/1978 | Harloff |
| 4,284,174 A | 8/1981 | Salvana et al. |
| 4,478,551 A | 10/1984 | Honeycutt, Jr. et al. |
| 4,583,413 A | 4/1986 | Lack |
| 4,641,543 A | 2/1987 | Jessup |
| 4,649,114 A | 3/1987 | Miltenburger et al. |
| 4,696,156 A | 9/1987 | Burr et al. |
| 4,979,362 A | 12/1990 | Vershure, Jr. |
| 5,102,379 A | 4/1992 | Pagluica et al. |
| 5,141,400 A | 8/1992 | Murphy et al. |
| 5,211,541 A | 5/1993 | Fledderjohn et al. |
| 5,317,877 A | 6/1994 | Stuart |
| 5,415,595 A | 5/1995 | Nelson |
| 5,433,674 A | 7/1995 | Sheridan et al. |
| 5,447,411 A | 9/1995 | Curley et al. |
| 5,466,198 A | 11/1995 | McKibbin et al. |
| 5,472,383 A | 12/1995 | McKibbin |
| 5,524,847 A | 6/1996 | Brodell et al. |
| 5,528,960 A | 6/1996 | Nagao et al. |
| 5,677,060 A | 10/1997 | Terentieva et al. |
| 5,778,659 A | 7/1998 | Duesler et al. |
| 5,815,922 A | 10/1998 | Sato |
| 5,842,946 A | 12/1998 | Ichiki |
| 5,857,836 A | 1/1999 | Stickler et al. |
| 5,915,917 A | 6/1999 | Eveker et al. |
| 5,975,841 A | 11/1999 | Lindemuth et al. |
| 5,985,470 A | 11/1999 | Spitsberg et al. |
| 6,117,036 A * | 9/2000 | Lanzon .............. B60K 17/344 |
| | | 475/204 |
| 6,122,985 A | 9/2000 | Altamura |
| 6,183,388 B1 | 2/2001 | Hawkins |
| 6,223,616 B1 | 5/2001 | Sheridan |
| 6,264,138 B1 | 7/2001 | Hawkins |
| 6,302,356 B1 | 10/2001 | Hawkins |
| 6,315,815 B1 | 11/2001 | Spadaccini et al. |
| 6,318,070 B1 | 11/2001 | Rey et al. |
| 6,387,456 B1 | 5/2002 | Eaton, Jr. et al. |
| 6,402,654 B1 | 6/2002 | Lanzon et al. |
| 6,517,341 B1 | 2/2003 | Brun et al. |
| 6,607,165 B1 | 8/2003 | Manteiga et al. |
| 6,622,473 B2 | 9/2003 | Becquerelle et al. |
| 6,666,102 B2 | 12/2003 | Gmirya |
| 6,709,492 B1 | 3/2004 | Spadaccini et al. |
| 6,732,502 B2 * | 5/2004 | Seda .................. F01D 5/03 |
| | | 60/226.1 |
| 6,814,541 B2 | 11/2004 | Evans et al. |
| 6,832,973 B1 | 12/2004 | Welsh |
| 6,886,325 B2 | 5/2005 | Norris et al. |
| 7,021,042 B2 | 4/2006 | Law |
| 7,328,580 B2 | 2/2008 | Lee et al. |
| 7,374,403 B2 | 5/2008 | Decker et al. |
| 7,591,754 B2 | 9/2009 | Duong et al. |
| 7,662,059 B2 | 2/2010 | McCune |
| 7,694,505 B2 | 4/2010 | Schilling |
| 7,704,178 B2 | 4/2010 | Sheridan et al. |
| 7,806,651 B2 | 10/2010 | Kennepohl et al. |
| 7,824,305 B2 | 11/2010 | Duong et al. |
| 7,926,260 B2 | 4/2011 | Sheridan et al. |
| 7,963,190 B2 | 6/2011 | Sullivan et al. |
| 7,997,868 B1 | 8/2011 | Liang et al. |
| 8,015,900 B2 | 9/2011 | Gmirya |
| 8,047,505 B2 | 11/2011 | Biester |
| 8,205,432 B2 | 6/2012 | Sheridan |
| 8,231,503 B2 | 7/2012 | Buelna |
| 2005/0081668 A1 | 4/2005 | Hagihara |
| 2005/0192151 A1 | 9/2005 | Simon |
| 2008/0003096 A1 | 1/2008 | Kohli et al. |
| 2008/0006018 A1 | 1/2008 | Sheridan et al. |
| 2008/0044276 A1 | 2/2008 | McCune et al. |
| 2008/0116009 A1 | 5/2008 | Sheridan et al. |
| 2008/0317588 A1 | 12/2008 | Grabowski et al. |
| 2009/0056343 A1 | 3/2009 | Suciu et al. |
| 2009/0062058 A1 | 3/2009 | Kimes et al. |
| 2009/0090096 A1 * | 4/2009 | Sheridan ............. F02C 7/36 |
| | | 60/226.3 |
| 2009/0227415 A1 | 9/2009 | Buelna |
| 2009/0277299 A1 | 11/2009 | Gmirya |
| 2009/0293278 A1 | 12/2009 | Duong et al. |
| 2009/0298640 A1 | 12/2009 | Duong et al. |
| 2010/0105270 A1 | 4/2010 | Peng |
| 2010/0105516 A1 | 4/2010 | Sheridan et al. |
| 2010/0148396 A1 | 6/2010 | Xie et al. |
| 2010/0212281 A1 | 8/2010 | Sheridan |
| 2010/0218483 A1 | 9/2010 | Smith |
| 2010/0331139 A1 | 12/2010 | McCune |
| 2011/0092331 A1 | 4/2011 | Haughom |
| 2011/0159797 A1 | 6/2011 | Beltman et al. |
| 2011/0206498 A1 | 8/2011 | McCooey |
| 2011/0293423 A1 | 12/2011 | Bunker et al. |
| 2012/0124964 A1 | 5/2012 | Hasel et al. |

FOREIGN PATENT DOCUMENTS

| | | |
|---|---|---|
| EP | 0896922 | 1/2004 |
| EP | 1876338 | 1/2008 |
| EP | 2241780 | 10/2010 |
| EP | 2327859 | 6/2011 |
| FR | 1357038 | 4/1964 |
| FR | 2742834 | 6/1997 |
| GB | 111329 | 11/1917 |
| GB | 364719 | 1/1932 |
| GB | 1516041 | 6/1978 |
| GB | 2041090 | 9/1980 |
| GB | 2426792 | 12/2006 |
| JP | 4636927 | 10/1971 |
| JP | 5-248267 | 9/1993 |
| JP | 9-317833 | 12/1997 |
| JP | 2001-208146 | 8/2001 |

(56) References Cited

FOREIGN PATENT DOCUMENTS

| JP | 39-20031 | 5/2007 |
|---|---|---|
| WO | 2007038674 | 4/2007 |
| WO | 2012010165 | 1/2012 |

OTHER PUBLICATIONS

Munt, R. (1981). Aircraft technology assessment: Progress in low emissions engine. Technical Report. May 1981. pp. 1-171.

Waters, M.N. and Schairer, E.T. (1977). Analysis of turbofan propulsion system weight and dimension& NASA Technical Memorandum. Jan. 1977. pp. 1-65.

Avco Lycoming Divison. ALF 502L Maintenance Manual. Apr. 1981. pp. 1-118.

Type Certificate Data Sheet No. E6NE. Department of Transportation Federal Aviation Administration. Jun. 7, 2002. pp. 1-10.

Trembley, Jr., H.F. (1977). Determination of effects of ambient conditions on aircraft engine emissions. Prepared for Environmental Protection Agency. Ann Arbor, Michigan. Sep. 1977 pp. 1-256.

Honeywell LF502. Jane's Aero-engines, Aero-engines—Turbofan. Feb. 9, 2012.

Honeywell LF502. Jane's Aero-engines, Aero-engines—Turbofan. Aug. 17, 2016.

Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.

Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.

Rauch, D. (1972). Design study of an air pump and integral lift engine ALF-504 using the Lycoming 502 core. Prepare for NASA. Jul. 1972. pp. 1-182.

Dassault Falcon 900EX Easy Systems Summary. Retrieved from: http://www.smartcockpit.com/docs/F900EX-Engines.pdf pp. 1-31.

Honeywell TFE731 Pilot Tips. pp. 1-143.

Honeywell TFE731-5AR to -5BR Engine Conversion Program. Sep. 2005. pp. 1-4.

Garret TFE731 Turbofan Engine (CAT C). Chapter 79: Lubrciation System. TTFE731 Issue 2. 2010. pp. 1-24.

McArdle, J.G. (1979). Static test-stand performance of the YF-102 turbofan engine with several exhaust configurations for the quiet short-haul research aircraft (QSRA). Nasa Technical Paper. Nov. 1979. pp. 1-68.

Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.

Middleton, P. (1971). 614: VFW's jet feederliner. Flight International, Nov. 4, 1971. p. 725, 729-732.

Schaefer, J.W., Sagerser, D.R., and Stakolich, E.G. (1977). Dynamics of high-bypass-engine thrust reversal using a variable-pitch fan. Technical Report prepare for NASA. NASA-TM-X-3524. May 1, 1977. pp. 1-31.

Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.

Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.

Baker, R.W. (2000). Membrane technology and applications. New York, NY: McGraw-Hill. pp. 87-153.

Cheryan, M. (1998). Ultrafiltration and microfiltration handbook. Lancaster, PA: Tecnomic Publishing Company, Inc. pp. 171-236.

Seader, J.D. and Henley, E.J. (1998). Separation process principles. New York, NY: John Wiley & Sons, Inc. pp. 722-726 and 764-771.

Spadaccini, L.J., and Huang, H. (2002). On-line fuel deoxygenation for coke suppression. ASME, Jun. 2002. pp. 1-7.

Darrah, S. (1987). Jet fuel deoxygenation. Interim Report for Period Mar. 1987-Jul. 1988. pp. 1-22.

Bucknell, R.L. (1973). Influence of fuels and lubricants on turbine engine design and performance, fuel and lubricant analyses. Final Technical Report, Mar. 1971-Mar. 1973. pp. 1-252.

Hazlett, R.N. (1991). Thermal oxidation stability of aviation turbine fuels. Philadelphia, PA: ASTM. pp. 1-163.

Taylor, W.F. (1974). Deposit formation from deoxygenated hydrocarbons. I. General features. Ind. Eng. Chem., Prod. Res. Develop., vol. 13(2). 1974. pp. 133-138.

Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.

Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.

Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.

Hemighaus, G., Boval, T., Bacha, J., Barnes, F., Franklin, M., Gibbs, L., . . . Morris, J. (2007). Aviation fuels: Techincal review. Chevron Products Company. pp. 1-94. Retrieved from: https://www.cgabusinessdesk.com/document/aviation_tech_review.pdf.

Spadaccini, L.J., Sobel, D.R., and Huang, H. (2001). Deposit formation and mitigation in aircraft fuels. Journal of Eng. for Gas Turbine and Power, vol. 123. Oct. 2001. pp. 741-746.

Edwards, T. and Zabarnick, S. (1993). Supercritical fuel deposition mechanisms. Ind. Eng. Chem. Res. vol. 32. 1993. pp. 3117-3122.

Huang, H., Sobel, D.R., and Spadaccini, L.J. (2002). Endothermic heat-sink of hydrocarbon fuels for scramjet cooling. AIAA/ASME/ASEE, Jul. 2002. pp. 1-7.

Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.

Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.

Technical Data. Teflon. WS Hampshire Inc. Retrieved from: http://catalog.wshampshire.com/Asset/psg_teflon_ptfe.pdf.

Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.

Edkins, D.P., Hirschkron, R., and Lee, R. (1972). TF34 turbofan quiet engine study. Final Report prepared for NASA. NASA-CR-120914. Jan. 1, 1972. pp. 1-99.

Waters, M.N. and Schairer, E.T. (1977). Analysis of turbofan propulsion system weight and dimensions. NASA Technical Memorandum. Jan. 1977. pp. 1-65.

Meyer, A.G. (1988). Transmission development of TEXTRON Lycoming's geared fan engine. Technical Paper. Oct. 1988. pp. 1-12.

Dudley, D.W., Ed. (1962). Gear handbook. New York, NY: McGraw-Hill. pp. 14-17 (TOC, Preface, and Index).

Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.

Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.

Gates, D. Bombardier flies at higher market. Seattle Times. Jul. 13, 2008. pp. C6.

Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.

(56) References Cited

OTHER PUBLICATIONS

Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.
Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.
McCune, M.E. (1993). Initial test results of 40,000 horsepower fan drive gear system for advanced ducted propulsion systems. AIAA 29th Joint Conference and Exhibit. Jun. 28-30, 1993. pp. 1-10.
Wright, G.H. and Russell, J.G. (1990). The M.45SD-02 variable pitch geared fan engine demonstrator test and evaluation experience. Aeronautical Journal., vol. 84(836). Sep. 1980. pp. 268-277.
Drago, R.J. (1974). Heavy-lift helicopter brings up drive ideas. Power Transmission Design. Mar. 1987. pp. 1-15.
Krantz, T.L. (1990). Experimental and analytical evaluation of efficiency of helicopter planetary stage. NASA Technical Paper. Nov. 1990. pp. 1-19.
Heingartner, P., MBA, D., Brown, D. (2003). Determining power losses in the helical gear mesh; Case Study. ASME 2003 Design Engineering Technical Conferences. Chicago, IL. Sep. 2-6, 2003. pp. 1-7.
Thulin, R.D., Howe, D.C., and Singer, I.D. (1982). Energy efficient engine: High pressure turbine detailed design report. Prepared for NASA. NASA CR-165608. pp. 1-178.
Reshotko, M., Karchmer, A., Penko, P.F. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.
McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.
Kurzke, J. (2009). Fundamental differences between conventional and geared turbofans. Proceedings of ASME Turbo Expo: Power for Land, Sea, and Air. 2009, Orlando, Florida. pp. 145-151.
Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.
Carney, K., Pereira, M. Revilock, and Matheny, P. (2003). Jet engine fan blade containment using two alternate geometries. 4th European LS-DYNA Users Conference. pp. 1-10.
Brines, G.L. (1990). The turbofan of tomorrow. Mechanical Engineering: The Journal of the American Society of Mechanical Engineers,108(8), 65-67.
Faghri, A. (1995). Heat pipe and science technology. Washington, D.C.: Taylor & Francis. pp. 1-60.
Hess, C. (1998). Pratt & Whitney develops geared turbofan. Flug Revue 43(7). Oct. 1998.
Grady, J.E., Weir, D.S., Lamoureux, M.G., and Martinez, M.M. (2007). Engine noise research in NASA's quiet aircraft technology project. Papers from the International Symposium on Air Breathing Engines (ISABE). 2007.
Griffiths, B. (2005). Composite fan blade containment case. Modern Machine Shop. Retrieved from: http://www.mmsonline.com/articles/composite-fan-blade-containment-case pp. 1-4.
Hall, C.A. and Crichton, D. (2007). Engine design studies for a silent aircraft. Journal of Turbomachinery, 129, 479-487.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.
Brennan, P.J. and Kroliczek, E.J. (1979). Heat pipe design handbook. Prepared for National Aeronautics and Space Administration by B & K Engineering, Inc. Jun. 1979. pp. 1-348.

Horikoshi, S. and Serpone, N. (2013). Introduction to nanoparticles. Microwaves in nanoparticle synthesis. Wiley-VCH Verlag GmbH & Co. KGaA. pp. 1-24.
Kerrebrock, J.L. (1977). Aircraft engines and gas turbines. Cambridge, MA: The MIT Press. p. 11.
Xie, M. (2008). Intelligent engine systems: Smart case system. NASA/CR-2008-215233. pp. 1-31.
Knip, Jr., G. (1987). Analysis of an advanced technology subsonic turbofan incorporating revolutionary materials. NASA Technical Memorandum. May 1987. pp. 1-23.
Willis, W.S. (1979). Quiet clean short-haul experimental engine (QCSEE) final report. NASA/CR-159473 pp. 1-289.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press. p. 465.
Ramsden, J.M. (Ed). (1978). The new European airliner. Flight International, 113(3590). Jan. 7, 1978. pp. 39-43.
Langston, L. and Faghri, A. Heat pipe turbine vane cooling. Prepared for Advanced Turbine Systems Annual Program Review. Morgantown, West Virginia. Oct. 17-19, 1995. pp. 3-9.
Oates, G.C. (Ed). (1989). Aircraft propulsion systems and technology and design. Washington, D.C.: American Institute of Aeronautics, Inc. pp. 341-344.
Lau, K, Gu, C., and Hui, D. (2005). A critical review on nanotube and nanotube/nanoclay related polymer composite materials. Composites: Part B 37(2006) 425-436.
Shorter Oxford English dictionary, fith Edition. (2007). vol. 2, N-Z. p. 1888.
Lynwander, P. (1983). Gear drive systems: Design and application. New York, New York: Marcel Dekker, Inc. pp. 145, 355-358.
Sweetman, B. and Sutton, O. (1998). Pratt & Whitney's surprise leap. Interavia Business & Technology, 53.621, p. 25.
Mattingly, J.D. (1996). Elements of gas turbine propulsion. New York, New York: McGraw-Hill, Inc. pp. 8-15.
Pyrograf-III Carbon Nanofiber. Product guide. Retrieved Dec. 1, 2015 from: http://pyrografproducts.com/Merchant5/merchant.mvc?Screen=cp_nanofiber.
Nanocor Technical Data for Epoxy Nanocomposites using Nanomer 1.30E Nanoclay. Nnacor, Inc. Oct. 2004.
Ratna, D. (2009). Handbook of thermoset resins. Shawbury, UK: iSmithers. pp. 187-216.
Wendus, B.E., Stark, D.F., Holler, R.P., and Funkhouser, M.E. (2003). Follow-on technology requirement study for advanced subsonic transport. NASA/CR-2003-212467. pp. 1-37.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.
Merriam-Webster's collegiate dictionary, 11th Ed. (2009). p. 824.
Merriam-Webster's collegiate dictionary, 10th Ed. (2001). p. 1125-1126.
Hughes, C. (2010). Geared turbofan technology. NASA Environmentally Responsible Aviation Project. Green Aviation Summit. NASA Ames Research Center. Sep. 8-9, 2010. pp. 1-8.
Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Moxon, J. How to save fuel in tomorrow's engines. Flight International. Jul. 30, 1983. 3873(124). pp. 272-273.
File History for U.S. Appl. No. 12/131,876.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.
Gunston, B. (Ed.) (2000). Jane's aero-engines, Issue seven. Coulsdon, Surrey, UK: Jane's Information Group Limited. pp. 510-512.
Ivchenko—Progress D-436. Jane's Aero-engines, Aero-engines—Turbofan. Feb. 8, 2012.
Ivchenko—Progress AI-727M. Jane's Aero-engines, Aero-engines—Turbofan. Nov. 27, 2011.

(56) References Cited

OTHER PUBLICATIONS

Ivchenko—Progress D-727. Jane's Aero-engines, Aero-engines—Turbofan. Feb. 7, 2007.
Turbomeca Aubisque. Jane's Aero-engines, Aero-engines—Turbofan. Nov. 2, 2009.
Aviadvigatel D-110. Jane's Aero-engines, Aero-engines—Turbofan. Jun. 1, 2010.
Rolls-Royce M45H. Jane's Aero-engines, Aero-engines—Turbofan. Feb. 24, 2010.
Honeywell LF507. Jane's Aero-engines, Aero-engines—Turbofan. Feb. 9, 2012.
Honeywell TFE731. Jane's Aero-engines, Aero-engines—Turbofan. Jul. 18, 2012.
NASA Conference Publication. Quiet, powered-lift propulsion. Cleveland, Ohio. Nov. 14-15, 1978. pp. 1-420.
"Civil Turbojet/Turbofan Specifications", Jet Engine Specification Database (Apr. 3, 2005).
Kandebo, S.W. (1993). Geared-turbofan engine design targets cost, complexity. Aviation Week & Space Technology, 148(8). Start p. 32.
Hendricks, E.S. and Tong, M.T. (2012). Performance and weight estimates for an advanced open rotor engine. NASA/TM-2012-217710. pp. 1-13.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Zalud, T. (1998). Gears put a new spin on turbofan performance. Machine Design, 70(20), p. 104.
Kurzke, J. (2008). Preliminary Design, Aero-engine design: From state of the art turbofans towards innovative architectures. pp. 1-72.
Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.
Han, J., Dutta, S., and Ekkad, S.V. (2000). Gas turbine heat transfer and cooling technology. New York, NY: Taylor & Francis. pp. 1-25, 129-157, and 160-249.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-280, 303-309, 323-326, 462-479, 517-520, 563-565, 673-675, 682-685, 697-699, 703-705, 802-805, 862-864, and 923-925.
Declaration of Reza Abhari, Ph.D. In re U.S. Pat. No. 8,844,265. Executed Jun. 28, 2016. pp. 1-91.
Declaration of John Eaton, Ph.D. In re U.S. Pat. No. 8,869,568. Executed Mar. 28, 2016. pp. 1-87.
Declaration of Reza Abhari. In re U.S. Pat. No. 8,695,920. Executed Nov. 30. pp. 1-67.
Declaration of Reza Abhari. In re U.S. Pat. No. 8,448,895. Executed Nov. 28. pp. 1-81.
Declaration of Reza Abhari. In re U.S. Pat. No. 8,695,920, claims 1-4, 7-14, 17 and 19. Executed Nov. 29. pp. 1-102.
Declaration of Dr. Magdy Attia. In re U.S. Pat. No. 8,313,280. Executed Oct. 21, 2016. pp. 1-88.
Lord, W.K., MacMartin, D.G., and Tillman, T.G. (2000). Flow control opportunities in gas turbine engines. American Institute of Aeronautics and Astronautics. pp. 1-15.
Daly, M. Ed. (2010). Jane's Aero-Engine. Issue Twenty-seven. Mar. 2010. p. 633-636.
Roux, E. (2007). Turbofan and turbojet engines database handbook. Editions Elodie Roux. Blagnac: France. pp. 1-595.
Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.
Declaration of Dr. Magdy Attia. In re U.S. Pat. No. 8,517,668. Executed Dec. 8, 2016. pp. 1-81.
Cramoisi, G. Ed. (2012). Death in the Potomac: The crash of Air Florida Flight 90. Air Crash Investigations. Accident Report NTSB/AAR-82-8. p. 45-47.

Norton, M. and Karczub, D. (2003). Fundamentals of noise and vibration analysis for engineers. Press Syndicate of the University of Cambridge. New York: New York. p. 524.
U.S. Department of Transportation: Federal Aviation Administration Advisory Circular. Runway overrun prevention. Dated: Nov. 6, 2007. p. 1-8 and Appendix 1 p. 1-15, Appendix 2 p. 1-6, Appendix 3 p. 1-3, and Appendix 4 p. 1-5.
U.S. Department of Transportation: Federal Aviation Administration Advisory Circular. Standard operating procedures for flight deck crewmembers. Dated: Feb. 27, 2003 . . . p. 1-6 and Appendices.
Vasudevan, A.K. and Petrovic, J.J. (1992). A comparative overview of molybedenum disilicide composites. Materials Science and Engineering, A155, 1992. pp. 1-17.
Clarke, D.R. and Levi, C.G. (2003). Materials design for the next generation thermal barrier coatings. Annual. Rev. Mater. Res. vol. 33. 2003. pp. 383-417.
Lee, K.N. (2000). Current status of environmental barrier coatings for Si-Based ceramics. Surface and Coatings Technology 133-134, 2000. pp. 1-7.
Bornstein, N. (1993). Oxidation of advanced intermetallic compounds. Journal de Physique IV, 1993, 03 (C9), pp. C9-367-C9-373.
Krenkel, W., Naslain, R., and Schneider, H. Eds. (2001). High temperature ceramic matrix composites pp. 224-229. Weinheim, DE: Wiley-VCH Verlag GmbH.
Cabala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.
Shah, D.M. (1992). MoSi2 and other silicides as high temperature structural materials. Superalloys 1992. The Minerals, Metals, & Materials Society. pp. 409-422.
Zhao, J.C. and Westbrook, J.H. (2003). Ultrahigh-temperature materials for jet engines. MRS Bulletin. vol. 28 (9). Sep. 2003. pp. 622-630.
Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.
Jacobson, N.S. (1993). Corrosion of silicon-based ceramics in combustion environments. J. Am. Ceram. Soc. 76(1). pp. 3-28.
Jorgensen, P.J., Wadsworth, M.E., and Cutler, I.B. (1961). Effects of water vapor on oxidation of silicon carbide. J. Am. Ceram. Soc. 44(6). pp. 248-261.
Xu, Y., Cheng, L., Zhang, L., Ying, H., and Zhou, W. (1999). Oxidation behavior and mechanical properties of C/SiC composites with Si-MoSi2 oxidation protection coating. J. of Mat. Sci. vol. 34. 1999. pp. 6009-6014.
Sundarma, S.K., Hsu, J-Y., Speyer, R.F. (1995). Molten glass corrosion resistance of immersed combustion-heating tube materials in e-glass. J. Am. Ceram. Soc. 78(7). pp. 1940-1946.
Jeng, Y.-L., Lavernia, E.J. (1994). Processing of molybdenum disilicide. J. of Mat. Sci. vol. 29. 1994. pp. 2557-2571.
Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.
Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.
Petrovic, J.J., Castro, R.G., Vaidya, R.U., Peters, M.I., Mendoza, D., Hoover, R.C., and Gallegos, D. E. (2001). Molybdenum disilicide materials for glass melting sensor sheaths. Ceramic Engineering and Science Proceedings. vol. 22(3). 2001. pp. 59-64.
Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.
Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.

(56) References Cited

OTHER PUBLICATIONS

Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.

Leckie, F.A. and Dal Bello, D.J. (2009). Strength and stiffness of engineering systems. Mechanical Engineering Series. Springer. pp. 1-3.

El-Sayad, A.F. (2008). Aircraft propulsion and gas turbine engines. Boca Raton, FL: CRC Press. pp. 215-219 and 855-860.

Bunker, R.S. (2005). A review of shaped hole turbine film-cooling technology. Journal of Heat Transfer vol. 127. Apr. 2005. pp. 441-453.

Partial European Search Report for European Patent Application No. 072530785 completed Nov. 22, 2007.

International Search Report and Written Opinion for International Application No. PCT/US2013/023356 completed on Oct. 22, 2013.

Special purpose gear units for petroleum, chemical, and gas industry services. API Standard 613 Fourth Edition. Jun. 1995. pp. 1-73.

Drago, R. J. (1988). Fundamentals of Gear Design. Stoneham, MA: Butterworth Publishers. pp. 22-23.

Drago, R. J. (1996). Helical gears. In J. E. Shigley & C. R. Mischke (Eds.), Standard Handbook of Machine Design (pp. 35.1-35.57). New York, NY: McGraw-Hill.

Day, P.C. (1911). Herringbone gears. American Society of Mechanical Engineers: Transaction. vol. 33. 1912. pp. 681-715.

Townsend, D. P. (Ed). (1962). Dudley's gear handbook. New York, NY: McGraw-Hill, Inc.

Supplementary European Search Report for European Application No. 13778366.8 completed Oct. 1, 2015.

DixiTech CNC. Helical gears, double helical gears.Retrieved Mar. 20, 2012 from: http://www.dixitechcnc.com/helical_gear.html.

Steczynski, M.E. (1933). Machine Design Book III (Parts 5-6). Scranton, PA: International Textbook Company. (sections 65-66).

International Preliminary Report on Patentability for PCT Application No. PCT/US2013/023356 dated Aug. 14, 2014.

\* cited by examiner

TURBINE ENGINE GEARBOX

CROSS REFERENCE TO RELATED APPLICATIONS

This application is a continuation of U.S. patent application Ser. No. 14/940,632, filed Nov. 13, 2015, which is a continuation of U.S. patent application Ser. No. 14/470,982, filed Aug. 8, 2014, which is a continuation of U.S. patent application Ser. No. 14/174,878, filed Feb. 7, 2014, which is a continuation-in-part of U.S. patent application Ser. No. 13/438,245, filed on Apr. 3, 2012, which claims priority to U.S. Provisional Application No. 61/592,964, filed on Jan. 31, 2012.

BACKGROUND

This disclosure relates generally to a turbine engine, and more specifically to a gearbox for a gas turbine engine.

A turbine engines includes a fan driven by a turbine. A gearbox is coupled between the fan to the turbine. The gearbox provides a speed decrease between the turbine and the fan.

SUMMARY

In a featured embodiment, a gas turbine engine has a fan, a compressor and a combustor, and a fan drive turbine rotor to drive the fan through a gear reduction. The gear reduction includes at least two double helical gears in meshed engagement, each of the at least two double helical gears disposed to rotate about respective axes, and each of the at least two double helical gears having a first plurality of gear teeth axially spaced from a second plurality of gear teeth by a spacer. Each of the first plurality of gear teeth has a first end facing the spacer and each of the second plurality of gear teeth has a first end facing the spacer. Each first end of the first plurality of gear teeth is circumferentially offset from each first end of the second plurality of gear teeth. A gear ratio of the gear reduction is greater than about 2.3:1.

In another embodiment according to the previous embodiment, the fan drive turbine drives a compressor rotor of the compressor, along with the fan through the gear reduction.

In another embodiment according to any of the previous embodiments, the gear reduction includes an epicyclic gear system.

In another embodiment according to any of the previous embodiments, the gear reduction is an epicyclic gear system that includes a sun gear, a ring gear, and a plurality of intermediate gears that engage the sun gear and ring gear.

In another embodiment according to any of the previous embodiments, the at least two helical gears are part of the plurality of intermediate gears.

In another embodiment according to any of the previous embodiments, the gear ratio of the gear reduction is greater than or equal to about 2.5:1.

In another embodiment according to any of the previous embodiments, there are two additional turbine rotors, with one of the two additional turbine rotors driving a low pressure compressor rotor, and a second of the additional turbine rotors driving a high pressure compressor rotor.

In another embodiment according to any of the previous embodiments, the gear reduction includes an epicyclic gear system.

In another embodiment according to any of the previous embodiments, the gear reduction is an epicyclic gear system that includes a sun gear, a ring gear, and a plurality of intermediate gears that engage the sun gear and ring gear.

In another embodiment according to any of the previous embodiments, the at least two helical gears are part of the plurality of intermediate gears.

In another featured embodiment, a method of designing a gas turbine engine includes providing a fan, a compressor and a combustor, and providing a fan drive turbine rotor to drive the fan through a gear reduction. The gear reduction includes at least two double helical gears in meshed engagement. Each of the at least two double helical gears are disposed to rotate about respective axes. Each of the at least two double helical gears have a first plurality of gear teeth axially spaced from a second plurality of gear teeth by a spacer. Each of the first plurality of gear teeth has a first end facing the spacer and each of the second plurality of gear teeth has a first end facing the spacer. Each first end of the first plurality of gear teeth is circumferentially offset from each first end of the second plurality of gear teeth. A gear ratio of the gear reduction is greater than about 2.3:1.

In another embodiment according to the previous embodiment, the fan drive turbine drives a compressor rotor, along with the fan through the gear reduction.

In another embodiment according to any of the previous embodiments, the gear reduction is an epicyclic gear system that includes a sun gear, a ring gear, and a plurality of intermediate gears that engage the sun gear and ring gear.

In another embodiment according to any of the previous embodiments, the at least two helical gears are part of the plurality of intermediate gears.

In another embodiment according to any of the previous embodiments, the gearbox includes an epicyclic gear system.

In another embodiment according to any of the previous embodiments, the gear reduction is an epicyclic gear system that includes a sun gear, a ring gear, and a plurality of intermediate gears that engage the sun gear and ring gear.

In another embodiment according to any of the previous embodiments, the at least two helical gears are part of the plurality of intermediate gears.

In another embodiment according to any of the previous embodiments, the gear ratio of the gear reduction is greater than or equal to about 2.5:1.

In another embodiment according to any of the previous embodiments, there are two additional turbine rotors, with one of the two additional turbine rotors driving a low pressure compressor rotor, and a second of the additional turbine rotors driving a high pressure compressor rotor.

These and other features can be best understood from the following specification and drawings, the following of which is a brief description.

DETAILED DESCRIPTION

Figure 1:
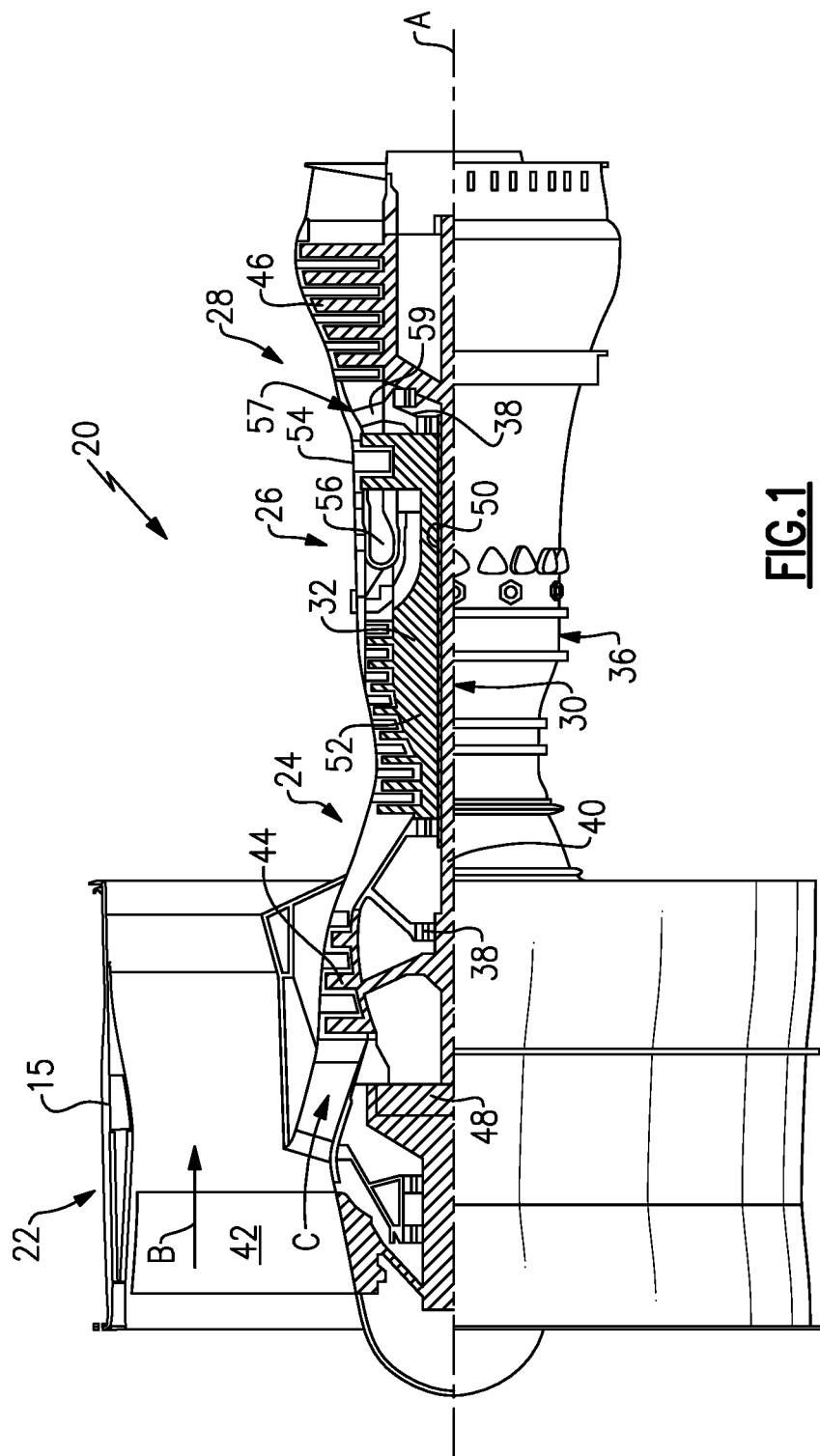
FIG. 1 is a cross-sectional view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a star system, a planetary gear system or other gear system, with a gear reduction ratio of greater than about 2.3 and the low pressure turbine 46 has a pressure ratio that is greater than about five.

In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second.

As can be appreciated, the low pressure turbine 46 is a fan drive turbine, as it drives the fan rotor 42. In the disclosed two-spool embodiment, the turbine 46 also drives a lower pressure compressor 44.

Figure 2:
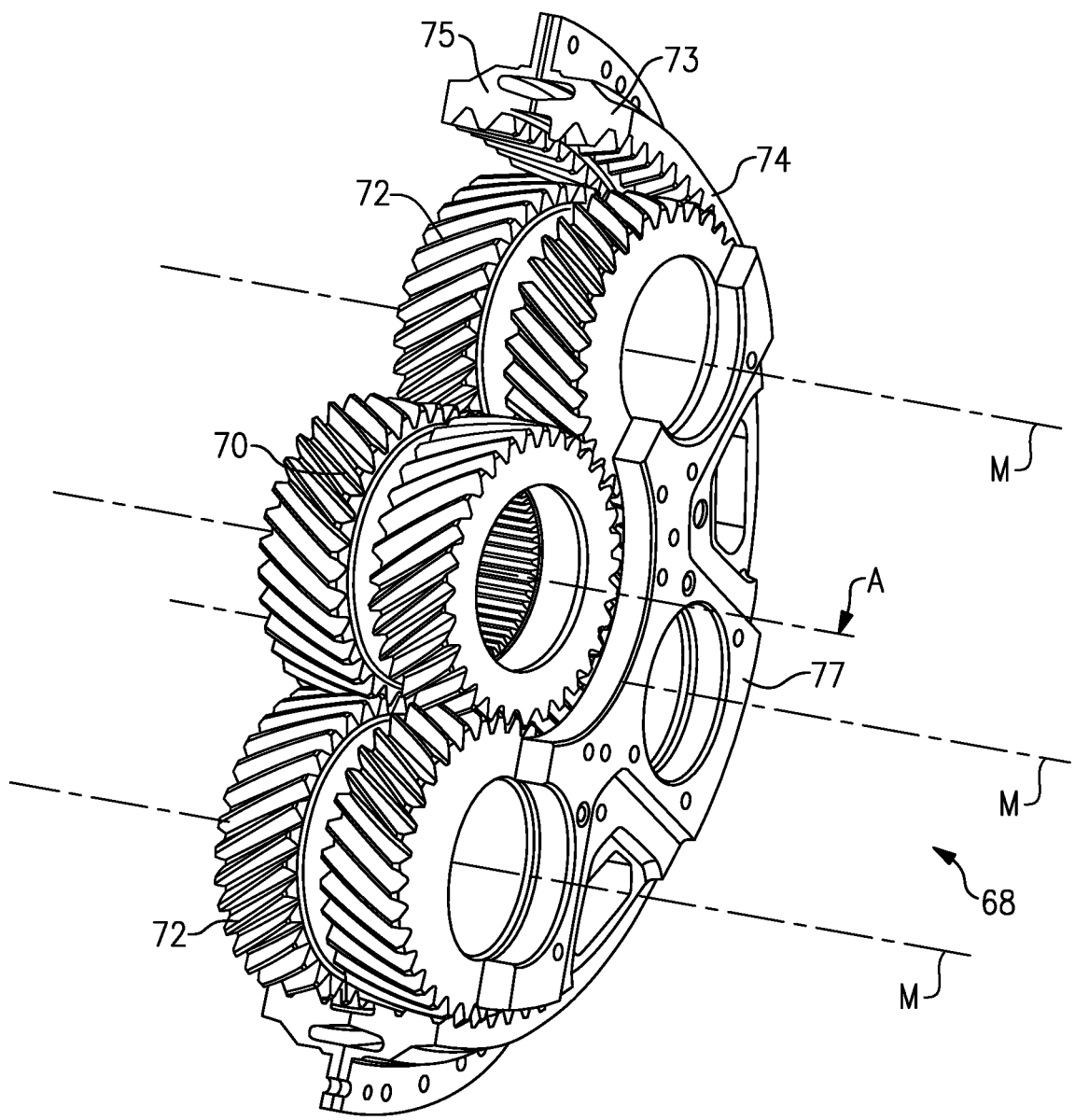
FIG. 2 is a perspective view of example gearbox.

FIG. 2 shows an example of the gearbox 48 as the epicyclical gear system 68 driven by the low speed spool 30. The epicyclical gear system 68 includes a sun gear 70, star gears 72, a ring gear 74, and a carrier 77. The sun gear 70 engages the star gears 72 and each star gear 72 engages the ring gear 74. In this example, each of the sun gear 70, star gears 72, and ring gear 74 are double helical gears, as will be described in further detail below.

Rotary motion of sun gear 70 urges each star gear 72 arranged about the sun gear 70 to rotate about their own respective axis M. The star gears 72 mesh with both the rotating ring gear 74 and rotating sun gear 70. The star gears 72 rotate about their respective axis M to drive the ring gear 74 to rotate about engine axis A. The rotation of the ring gear 74 drives the fan 42 (FIG. 1) at a lower speed than the low spool 30. The ring gear 74 is a split assembly and includes a first section 73 and a second section 75 that are urged together by the star gears 72.

In one example, the sun gear 70, star gears 72, and ring gear 74 have a transverse contact ratio greater than two (2) such that at least two gear teeth of each gear 70, 72, 74 engage at least two gear teeth of another gear 70, 72, 74 during operation.

The gearbox 48 is subject to variations in torque transfer due to geometry and manufacturing tolerances. These variations cause vibrations in the gearbox 48, which are imparted on other associated turbine engine components. The resultant vibration affects durability of gearbox 48 components, and associated turbine engine components, thus affecting the life of the gearbox 48 and gas turbine engine 20 components.

Figure 3:
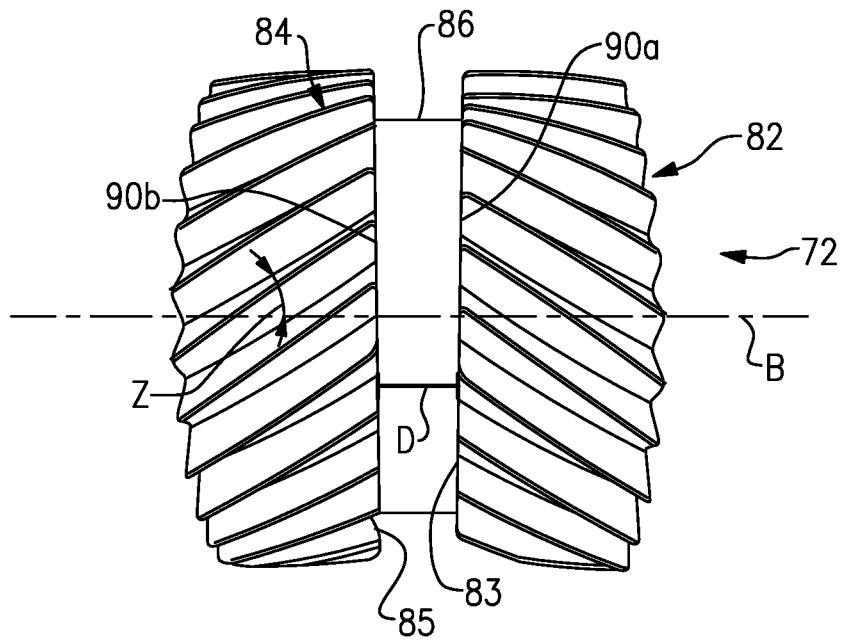
FIG. 3 is a perspective view of an example double helical gear.
Figure 4:
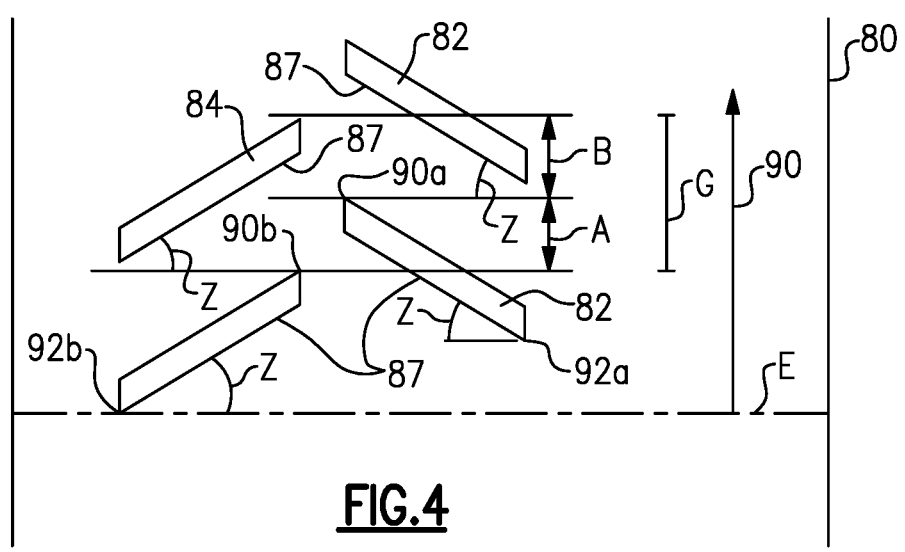
FIG. 4 is a top schematic view of teeth of the example double helical gear of FIG. 3.

FIGS. 3 and 4 shows an example of one of the star gears 72 as a double helical gear. It is to be understood that the described examples herein are also applicable to the sun gear 70, and ring gear 74, as well as other gears or gear systems of the gas turbine engine 20.

The star gear 72 includes a first plurality of gear teeth 82 disposed on a first base 83 opposite a second plurality of gear teeth 84 disposed on a second base 85 along axis B. The first plurality of gear teeth 82 and the second plurality of gear teeth 84 are separated by a non-toothed ring 86 disposed about axis B such that a first end 90a of the first plurality of gear teeth 82 and a first end 90b of the second plurality of gear teeth 84 are spaced apart an axial distance D equal to the width of the ring 86. The first plurality of gear teeth 82 and the second plurality of gear teeth 84 are rotatable around axis B.

In one example, the axial distance D of the width of non-toothed ring 86 is between 16% and 24% of the total axial length of the gear. In a further example, the first plurality of gear teeth 82 and the second plurality of gear teeth 84 each have an equal helix angle Z. In a further example, each of the first plurality of gear teeth 82 and the second plurality of gear teeth 84 have the same helix angle Z such that no axial thrust load is generated along axis B.

In another example, helix angle Z of the first plurality of gear teeth 82 is different than the helix angle Z of the second plurality of gear teeth 84, to generate a pre-determined thrust load along axis B in the gas turbine engine 20.

Each of the second plurality of gear teeth 84 includes the first end 90b and a second end 92b. Similarly, each of the first plurality of gear teeth includes the first end 90a and a second end 92a. In one example, the second plurality of gear teeth 84 is offset a circumferential offset distance A in relation to the next gear tooth 82 of the first plurality of gear teeth 82 when moving in circumferential direction of arrow 90. The first end 90a of each of the first plurality of gear teeth 82 is similarly spaced a circumferential offset distance E apart from the first end 90b of the next corresponding gear tooth 84 of the second plurality of gear teeth 84 when moving in direction of arrow 90. Circumferential offset distance G is a total of the circumferential offset distance A and the circumferential offset distance E between adjacent teeth of the second plurality of gear teeth 84 or first plurality of gear teeth 82.

Each of the first plurality of gear teeth 82 and second plurality of gear teeth 84 are arranged at the helix angle Z between axis B and a circumferential surface 87 each of the first plurality of gear teeth 82 and the second plurality of gear teeth 84. In this example, each of the first plurality of gear teeth 82 and the second plurality of gear teeth 84 are arranged at an equivalent helix angle Z relative to axis B.

In one example, the helix angle Z is between 30 and 35 degrees. In a further example, the helix angle Z is 33 degrees. The given helix angle Z or range urges the first section 73 and second section 75 of the ring gear 74 together.

The selected helix angle Z also influences the dynamics of the gearbox 48. As the helix angle Z increases from 0, a greater number of gear teeth 82, 84 engage teeth 82, 84 of a mating sun gear 70 and ring gear 74 (See FIG. 2). Selecting the first plurality of gear teeth 82 and second plurality of gear teeth 84 with the disclosed helix angle Z provides additional contact, and higher torque transfer, while maintaining the size of star gear 72.

Circumferential offset distance A and circumferential offset distance E are determined and used to offset each of the first plurality of gear teeth 82 from the next corresponding tooth 84 of the second plurality of gear teeth 84 between 0% and 100% of the circumferential offset distance G between each of the respective first plurality of gear teeth 82 or second plurality of gear teeth 84. In another example, the first plurality of gear teeth 82 are between about 25% to 75% offset from the second plurality of gear teeth 84 such that the ratio of circumferential offset distance A to circumferential offset distance G is between about 0.25 and 0.75. In a further example, the first plurality of gear teeth 82 are 50% offset from the second plurality of gear teeth 84, such that circumferential offset distance A and circumferential offset distance E are equal.

In another example, the circumferential offset distance A is selected in response to a gear characteristic of the star gear 72. The gear characteristic is at least one of harmonic level, transmission error, and vibration level through the star gear 72.

Figure 5A:
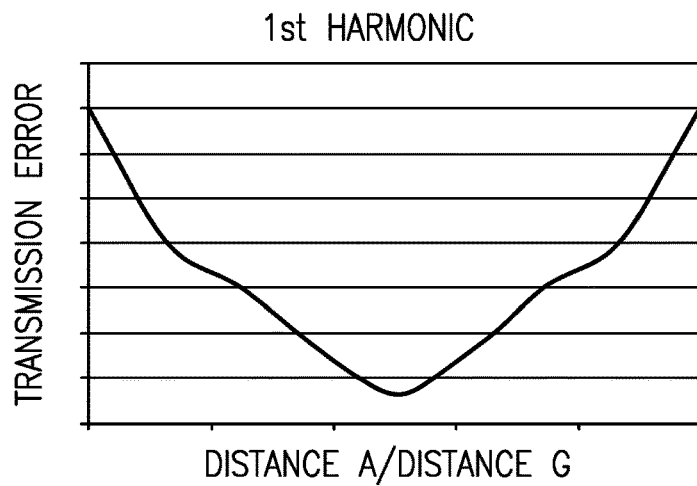
FIGS. 5A-5C are graphs illustrating example transmission error and gear teeth offsetting of the example double helical gear of FIG. 3.
Figure 5B:
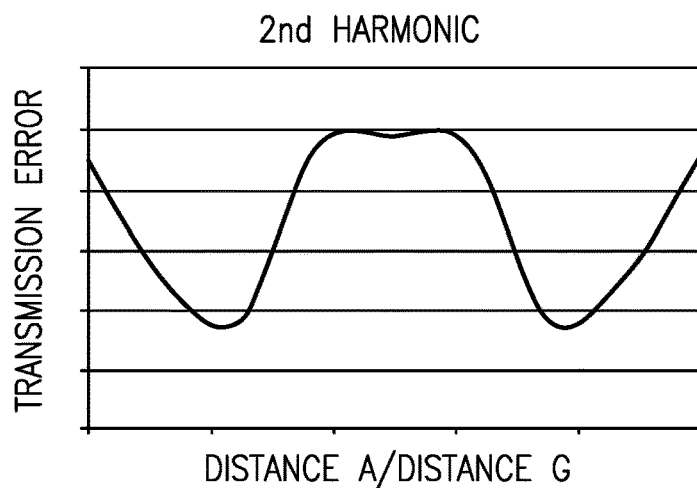
Figure 5C:
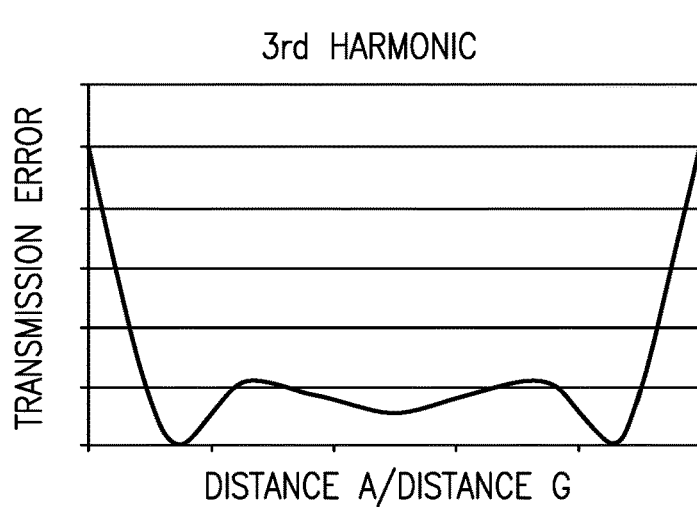

FIGS. 5A-5C show the circumferential offset distance A is pre-determined to provide a percent offset (axis X) in response to a frequency of the star gear 72 during meshing of star gears 72 in the gearbox 48. The percent offset results in a change in transmission error to effect the chosen frequency. Performance of the star gear 72 is controlled in response to the frequency based on the selected percent offset to reduce or minimize the amount of transmission error and vibration.

The frequency represents a harmonic level. In this example, a first harmonic has a frequency equal to the number of teeth on the sun gear times the revolutions per second of the sun gear relative to the carrier 77, a second harmonic has a frequency of 2 times the first harmonic, and a third harmonic has a frequency of 3 times the first harmonic. For each of the first harmonic, second harmonic, and third harmonic, transmission error is controlled by selecting a pre-determined percent offset between the first plurality of gear teeth 82 and second plurality of gear teeth 84, as equates to circumferential offset distance A and circumferential offset distance E. Transmission error is defined herein as the deviation between the circumferential position that the star gear 72 should have and the actual position during meshing.

In one example, as shown in FIG. 5A, the first plurality of gear teeth 82 are between about 25% to 75% offset from the second plurality of gear teeth 84 such that a ratio of circumferential offset distance A to circumferential offset distance G is between about 0.25 and 0.75 to reduce transmission error in the first harmonic.

In a further example, as shown in FIG. 5B, the first plurality of gear teeth 82 are between about 15% to 25% or 75% to 85% offset from the second plurality of gear teeth 84 such that a ratio of circumferential offset distance A to circumferential offset distance G is between about 0.15 and 0.25 or between about 0.75 and 0.85 to reduce transmission error in the second harmonic.

In a further example, as shown in FIG. 5C, the first plurality of gear teeth 82 are between about 15% to 85% offset from the second plurality of gear teeth 84 such that a ratio of circumferential offset distance A to circumferential offset distance G is between about 0.15 and 0.85 to reduce transmission error in the third harmonic.

In a further embodiment, the first plurality of gear teeth 82 are offset about 50% from the second plurality of gear teeth 84 such that a ratio of circumferential offset distance A to circumferential offset distance G is about 0.5 to reduce transmission error in the first harmonic and the third harmonic.

Offsetting the first plurality of gear teeth 82 and the second plurality of gear teeth 84 the circumferential offset distance A or circumferential offset distance E reduces the overall transmission error of the gearbox 48. Circumferential offset distance A and circumferential offset distance E are determined depending on the harmonic level(s) of the star gears 72 during meshing. Performance of the gearbox 48, which is controlled by reduction in transmission error, reduces vibration in the gearbox 48 and gas turbine engine 20 during operation. Thus, torque transfer is smoother, with less overall effect on engine component life and efficiency due to vibration.

Figure 6:
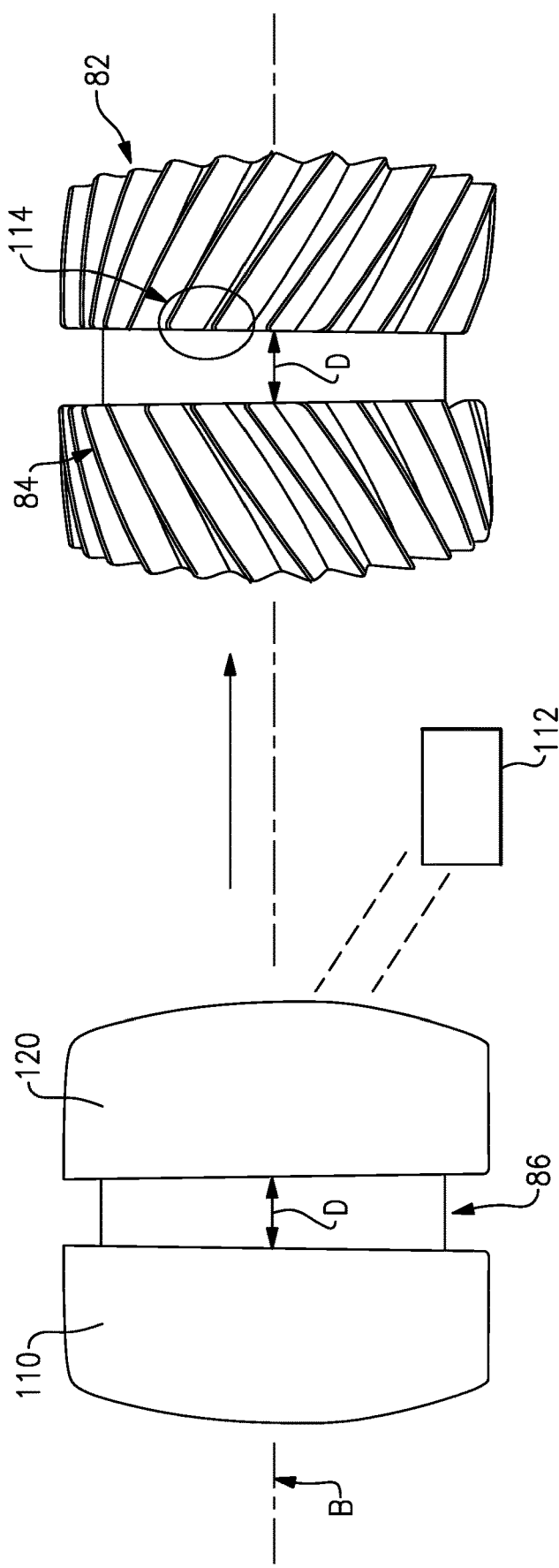
FIG. 6 is a perspective view of the steps of forming the example double helical gear of FIG. 3.

Referring to FIG. 6, an example method of forming the star gear 72 is shown. A first cylinder 110 and second cylinder 120 are arranged on either axial side of ring 86 along axis B. A tool 112 (shown schematically) is provided and machines grooves in the first cylinder 110 and the second cylinder 120 to form the first plurality of gear teeth 82 and second plurality of gear teeth 84. The first plurality of gear teeth 82 and second plurality of gear teeth 84 are arranged at an helix angle Z and offset an circumferential offset distance A and circumferential offset distance E, as described above. After one of the first plurality of gear teeth 82 and second plurality of gear teeth 84 are formed, the tool 112 is used to form the remaining plurality of gear teeth 82, 84 without affecting the dimensions of the already formed first plurality of gear teeth 82 or second plurality of gear teeth 84. As shown in FIG. 6, the star gear 72 is a one-piece gear formed from the first and second cylinders 110, 120, with the portions of the star gear 72 defining the gear teeth 82, 84 fixed to each other by the ring 86. The space between first cylinder 110 and second cylinder 120 provided by ring 86 allows the tool 112 to form the plurality of gear teeth 82, 84 without affecting the already formed plurality of gear teeth 82, 84. By offsetting the first plurality of gear teeth 82 and second plurality of gear teeth 84, the tool 112 is able to move into the space 114 between the already formed plurality of gear teeth 82, 84, thus reducing the width D of ring 86 needed to form the unformed plurality of gear teeth 82, 84. The reduction of width D decreases the weight of the star gear 72.

Although the example first cylinder 110 and second cylinder 120 are shown, it is within the contemplation of this disclosure to use other geometrical sections to form the star gear 72 based on gas turbine engine 20 specifications. In one example, the tool 112 is a grinding wheel.

Figure 7:
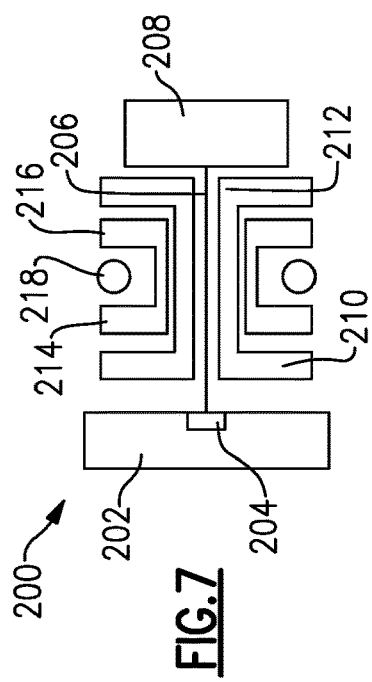
FIG. 7 shows an alternative embodiment.

FIG. 7 shows an embodiment 200, wherein there is a fan drive turbine 208 driving a shaft 206 to in turn drive a fan rotor 202. A gear reduction 204 may be positioned between the fan drive turbine 208 and the fan rotor 202. This gear reduction 204 may be structured, mounted and operate like the gear reduction disclosed above. A compressor rotor 210 is driven by an intermediate pressure turbine 212, and a second stage compressor rotor 214 is driven by a turbine rotor 216. A combustion section 218 is positioned intermediate the compressor rotor 214 and the turbine rotor 216.

Figure 8:
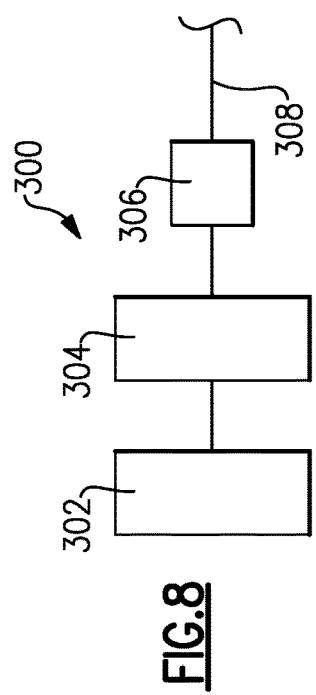
FIG. 8 shows another alternative embodiment.

FIG. 8 shows yet another embodiment 300 wherein a fan rotor 302 and a first stage compressor 304 rotate at a common speed. The gear reduction 306 (which may be structured, mounted and operated as disclosed above) is intermediate the compressor rotor 304 and a shaft 308 which is driven by a low pressure turbine section.

Although a preferred embodiment has been disclosed, a worker of ordinary skill in this art would recognize that certain modifications would come within the scope of this disclosure. For that reason, the following claims should be studied to determine the true scope and content of this disclosure.

What is claimed is:

1. A gas turbine engine comprising:
a fan section including a fan and an outer housing surrounding the fan to define a bypass duct;
a compressor and a combustor;
a spool including a fan drive turbine that drives the fan through a gear reduction; and
wherein the gear reduction is an epicyclic gear system that includes a sun gear, a ring gear, and a plurality of intermediate gears that engage the sun gear and the ring gear, and rotation of the ring gear drives the fan at a lower speed than the spool;
wherein the gear reduction includes at least two double helical gears in meshed engagement, each of the at least two double helical gears disposed to rotate about respective axes, each of the at least two double helical gears having a first plurality of gear teeth separated from a second plurality of gear teeth such that a first end of the first plurality of gear teeth and a first end of the second plurality of gear teeth are spaced apart by an axial distance, and the at least two double helical gears are part of the plurality of intermediate gears;
wherein each of the first plurality of gear teeth is offset a first circumferential offset distance in relation to a next gear tooth of the second plurality of gear teeth when moving in a circumferential direction relative to the respective axes, each of the second plurality of gear teeth is offset a second circumferential offset distance in relation to a next gear tooth of the first plurality of gear teeth when moving in the circumferential direction, a third circumferential offset distance being a total of the first circumferential offset distance and the second circumferential offset distance, and a ratio of the first circumferential offset distance and the third circumferential offset distance is between 0.25 and 0.75; and
wherein each gear tooth of the first plurality of gear teeth and the second plurality of gear teeth is disposed at a respective helix angle relative to the respective axes, the respective helix angle of the first plurality of gear teeth and the second plurality of gear teeth being between 30 degrees and 35 degrees.

2. The gas turbine engine as set forth in claim 1, wherein the first circumferential offset distance is selected in response to a gear characteristic that is at least one of a harmonic level, a transmission error, and a vibration level.

3. The gas turbine engine as set forth in claim 2, wherein the gear characteristic is the harmonic level.

4. The gas turbine engine as set forth in claim 3, wherein the harmonic level is at least one of a first harmonic level, a second harmonic level and a third harmonic level.

5. The gas turbine engine as set forth in claim 4, wherein the respective helix angle of the first plurality of gear teeth and the second plurality of gear teeth corresponds to a transverse contact ratio between the first plurality of gear teeth and the second plurality of gear teeth.

6. The gas turbine engine as set forth in claim 5, wherein the transverse contact ratio is greater than 2.

7. The gas turbine engine as set forth in claim 6, wherein the harmonic level includes the first harmonic level.

8. The gas turbine engine as set forth in claim 7, wherein the helix angle of the first plurality of gear teeth is different from the helix angle of the second plurality of gear teeth.

9. The gas turbine engine as set forth in claim 7, wherein each of the first plurality of gear teeth and the second plurality of gear teeth have the same helix angle.

10. The gas turbine engine as set forth in claim 9, wherein a gear ratio of the gear reduction is greater than 2.5:1.

11. The gas turbine engine as set forth in claim 10, further comprising:
a bypass ratio of greater than 10;
wherein the fan has a low fan pressure ratio of less than 1.45 across the fan blade alone; and
wherein the fan drive turbine includes an inlet, an outlet and a pressure ratio of greater than 5, the pressure ratio being pressure measured prior to the inlet as related to pressure at the outlet prior to an exhaust nozzle.

12. The gas turbine engine as set forth in claim 11, wherein the ring gear is a split assembly that includes a first section and a second section that are urged together by the plurality of intermediate gears in response to rotation of the plurality of intermediate gears.

13. The gas turbine engine as set forth in claim 12, wherein the axial distance is equal to between 16% and 24% of a total axial length of a respective one of the at least two double helical gears relative to the respective axes.

14. The gas turbine engine as set forth in claim 13, wherein the helix angle of the first plurality of gear teeth and the second plurality of gear teeth is about 33 degrees.

15. The gas turbine engine as set forth in claim 14, further comprising a spacer separating the first plurality of gear teeth and the second plurality of gear teeth, the spacer having a width equal to the axial distance.

16. The gas turbine engine as set forth in claim 15, wherein the fan drive turbine drives a compressor rotor of the compressor, along with the fan through the gear reduction, and a low corrected fan tip speed of less than 1150 feet/second.

17. The gas turbine engine as set forth in claim 16, wherein each of the at least two double helical gears is a one-piece gear.

18. A gas turbine engine comprising:
a fan section including a fan and an outer housing surrounding the fan to define a bypass duct;
a bypass ratio of greater than 10;
a first compressor and second compressor; and
a fan drive turbine that drives the fan through a gear reduction, and a second turbine;
wherein the gear reduction is an epicyclic gear system including a sun gear, a ring gear, and a plurality of intermediate gears that engage the sun gear and the ring gear;
wherein the gear reduction includes a plurality of double helical gears in meshed engagement, each of the plurality of double helical gears disposed about respective axes, each of the plurality of double helical gears having a first plurality of gear teeth and a second plurality of gear teeth separated by a spacer disposed about the respective axes such that a first end of the first plurality of gear teeth and a first end of the second plurality of gear teeth are spaced apart by an axial distance equal to a width of the spacer, and the at least two double helical gears are part of the plurality of intermediate gears;
wherein each of the first plurality of gear teeth is offset a first circumferential offset distance in relation to a next gear tooth of the second plurality of gear teeth when moving in a circumferential direction relative to the respective axes, and each of the second plurality of gear teeth is offset a second circumferential offset distance in relation to a next gear tooth of the first plurality of gear teeth when moving in the circumferential direction, a third circumferential offset distance being a total of the first circumferential offset distance and the second circumferential offset distance, the first circumferential offset distance selected in response to a gear characteristic, and a ratio of the first circumferential offset distance and the third circumferential offset distance is between 0.15 and 0.85; and
wherein the first plurality of gear teeth and the second plurality of gear teeth are disposed at a helix angle relative to the respective axes, and the helix angles is between 30 degrees and 35 degrees.

19. The gas turbine engine as recited in claim 18, wherein the fan has a low fan pressure ratio of less than 1.45 across the fan blade alone.

20. The gas turbine engine as recited in claim 19, wherein the gear characteristic is at least one of a harmonic level, and the harmonic level is at least one of a first harmonic level, a second harmonic level and a third harmonic level.

21. The gas turbine engine as set forth in claim 20, wherein a gear ratio of the gear reduction being greater than or equal to 2.5:1.

22. The gas turbine engine as set forth in claim 21, wherein each of the plurality of double helical gears is a one-piece gear.

23. The gas turbine engine as set forth in claim 22, wherein the harmonic level includes the second harmonic level.

24. The gas turbine engine as recited in claim 23, wherein the ratio of the first circumferential offset distance and the third circumferential offset distance is between 0.15 and 0.25, or is between 0.75 and 0.85.

25. The gas turbine engine as recited in claim 22, wherein the ratio of the first circumferential offset distance and the third circumferential offset distance is between 0.25 and 0.75.

26. The gas turbine engine as recited in claim 25, wherein rotation of the ring gear drives the fan at a lower speed than an input to the gear reduction.

27. The gas turbine engine as set forth in claim 26, wherein the fan drive turbine includes an inlet, an outlet and a pressure ratio of greater than 5, the pressure ratio being pressure measured prior to the inlet as related to pressure at the outlet prior to an exhaust nozzle.

28. The gas turbine engine as recited in claim 27, wherein the plurality of double helical gears are the sun gear, the plurality of intermediate gears, and the ring gear.

29. The gas turbine engine as set forth in claim 28, wherein the fan drive turbine drives a compressor rotor of the first compressor, along with the fan through the gear reduction, and a low corrected fan tip speed of less than 1150 feet/second.

30. The gas turbine engine as set forth in claim 29, wherein the helix angle of the first plurality of gear teeth is different from the helix angle of the second plurality of gear teeth.

* * * * *